Dec. 7, 1965  W. T. RENTSCHLER  3,221,629
INTRA-LENS SHUTTER
Filed Aug. 27, 1963
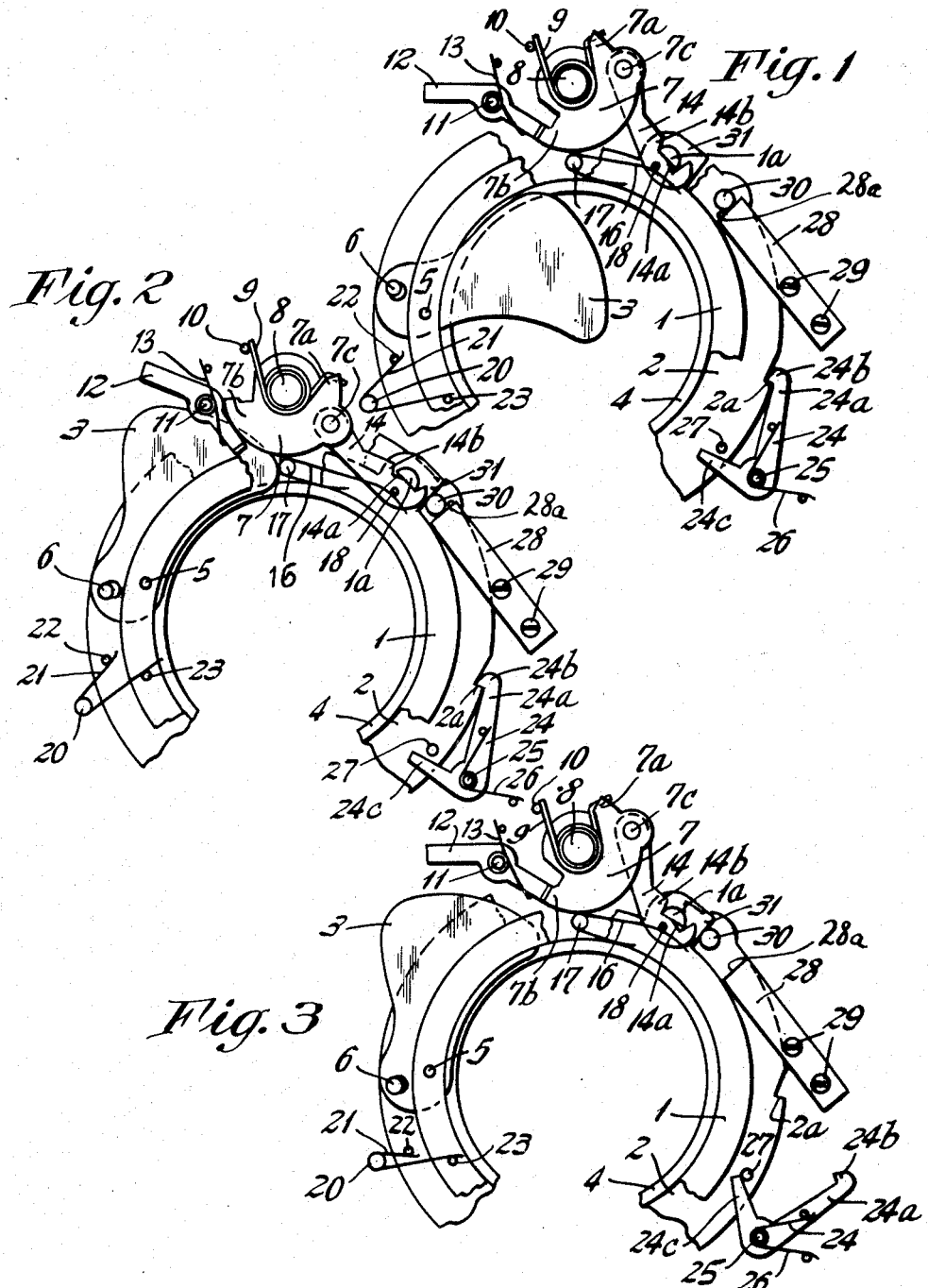
INVENTOR.
Waldemar T. Rentschler
BY
Arthur A. March
ATTORNEY

United States Patent Office 3,221,629
Patented Dec. 7, 1965

3,221,629
INTRA-LENS SHUTTER
Waldemar T. Rentschler, Calmbach (Enz), Germany, assignor to Alfred Gauthier, G.m.b.H., Calmbach (Enz), Germany, a corporation of Germany
Filed Aug. 27, 1963, Ser. No. 304,802
Claims priority, application Germany, Sept. 5, 1962, G 35,851
6 Claims. (Cl. 95—63)

This invention relates to a photographic intra-lens shutter having two member for positioning the shutter blade or blades, one of the elements being operative to move the blades when taking a photograph and the other member being operative to move the blades in order to focus through the lens and to use the lens as part of a viewfinder. In particular, the invention relates to an intra-lens shutter for a single-lens reflex camera.

It is well known to mount the shutter blades so that they can be driven by a reciprocating driving member, usually a ring, which rotates first in one direction to open the shutter and then in the reverse direction to close the shutter again. In order to produce very short exposure times, a fixed stop may be placed so as to intercept a projection on the ring at the instant of full opening of the shutter so that the projection bounces off of the stop and the kinetic energy of the ring is not dissipated but is still available to accelerate the ring in the opposite direction.

This rebounding effect is easily attained in those intra-lens shutters having shutter blades positioned on fixed pivot pins. However, in intra-lens shutters which must be opened to permit the lens to be used for focusing, as for example, in single lens reflex cameras, the pivot pins for the shutter blades are not fixed but are mounted on a second member, which may be a rotatable ring and may be called a positioning ring. The latter ring may be rotated by a separate actuating device independently of the exposure mechanism, and even though it is returned to its starting position before the driving ring is operated to make a photographic exposure, it has been impossible heretofore to avoid at least some motion of the positioning ring. As a result, the second ring, on which the pivot pins are mounted, cannot be described as absolutely rigid and thus if the driving ring were provided with a projection that run up against a fixed stop, some of the kinetic energy would be transferred to the positioning ring, and the rebounding effect would be reduced.

It is one of the principal objects of the present invention to provide an intra-lens shutter of the type having two separate members for controlling the positions of the shutter blades with rebounding means that can utilize substantially all of the kinetic energy of the driving member to shorten the duration of the exposure.

In accordance with the present invention and in carrying out the foregoing principal object, a fixed stop is provided in the shutter, and the member that positions the shutter blades during through-the-lens focusing engages the stop rigidly by means of a projection on this positioning member and under the influence of a spring that always returns this member to its starting place with firm contact between the stop and the projection. In addition the shutter includes a second member which controls the movement of the shutter blades during photographic exposure and this second member is likewise provided with a projection which strikes a rebounding stop on the first member at the instant that the shutter blades reach a point in their movement at which reversal of their motion is desired. Thus there is created, in a shutter having two movable members for controlling the position of the shutter blades, a rebounding device for photographic intra-lens shutters which produces the same rebounding effect that can be obtained in shutters in which the shutter blades are positioned on fixed pivot pins. By including the member used for positioning the shutter blades during focusing in the chain of the shutter members that take part in the rebounding process, it is possible to avoid the damping motions that occur during the impact of the projections against the stops.

A particularly advantageous form of the shutter, which requires a minimum of structural members, is produced when the projection cooperating with the fixed stop is also the rebounding, or counter, stop for the driving member.

Details of the invention will become apparent from the following specification together with the drawing in which:

FIG. 1 shows a plan view of the elements of a photographic intra-lens shutter constructed according to this invention and provided with a driving device, the shutter being shown with the blades in closed position and the driving device cocked;

FIG. 2 shows the shutter of FIG. 1 with the shutter blades fully open and the driving mechanism in operation and at the instant of reversal of direction of motion of the shutter blades and the member driving the blades; and FIG. 3 shows the same shutter of the preceding figures with the driving mechanism again in cocked position and the shutter blades fully open for the purpose of using the lens as a view finder.

The shutter in FIG. 1 comprises a driving member 1 and a positioning member 2. The members 1 and 2 are rotatably mounted on the central nozzle portion 4 of the shutter housing (not shown). Both of these members are in the form of rings and are connected to shutter blades 3, only one of which is shown in the drawing. A plurality of pivot pins 5 is mounted on the driving ring 1 to act as pivot points for the blades 3 while a corresponding plurality of pins 6 is mounted on the positioning ring 2 to engage slots in the shutter blades 3 so as to move the blades during relative movement between the rings 1 and 2.

The driving ring 1 is connected to a driving device which, in the embodiment shown, includes a disc 7 rigidly attached to a shaft 8 which is rotatably mounted alongside the rings 1 and 2. One end of a spring 9 bears against a fixed pin 10 while the other end of the spring engages a projecting edge 7a of the disc 7 to urge the disc 7 in the clockwise direction. As is well known, the shaft 8 may be coupled to any suitable cocking device, such as, for example, the film transport control, so that the disc 7 will be rotated to the cocked position shown in FIG. 1 each time a fresh area of film is transported into position for the taking of a photograph. The disc 7 is retained in its cocked position by means of a projection 7b which cooperates with a two-armed arresting lever 12 that is rotatably mounted on a fixed pivot pin 11. A spring 13 extends pressure on the lever 12 in the counterclockwise direction to hold the lever in place against the disc 7 until the lever is operated to make a photographic exposure.

The disc 7 also has a pin 7c on which one end of a driving pawl 14 is articulately mounted. The other end of the driving pawl 14 has coupling jaws 14a which embrace a pin 1a of semi-circular across section which extends from the driving ring 1. A coil spring 16 is mounted on a fixed pin 17 and presses against a pin 18 on the driving pawl 14 to keep the coupling jaws 14a in engagement with the pin 1a.

When the driving mechanism operates to make an exposure, the ring 1 first moves clockwise due to the force exerted on the pin 1a by the driving pawl 14 which in turn is moved by the pressure of the disc 7 under the force exerted by the spring 9. During the initial clockwise rotation of the ring 1 the shutter blades 3 swing outwardly in a counterclockwise direction about the pins 6 until the blades reach the open position illustrated in FIG. 2. As the driving disc 7 continues to rotate clockwise beyond the point illustrated in FIG. 2, the driving pawl 14 is drawn back to the left and pulls the pin 1a back with it, thus reversing the motion of ring 1 and pivoting the shutter blades 2 clockwise to their original closed position.

During this entire process the positioning ring 2 remains in its inoperative position. During the subsequent recocking of the driving disc 7 by means of the film transport device as stated above, the driving pawl 14 slides with its outer edge 14b engaging the jaws 14a along the lower surface of the pin 1a, thereby reestablishing the connection illustrated in FIGS. 1 and 3 between the jaws 14a and the pin 1a only at the end of the cocking process due to the pressure of the spring 16. Thus, during the cocking process, the driving ring 1 is not moved but remains in its inoperative position. Furthermore, a spring 21 mounted on a fixed pin 20 exerts pressure on a pin 22 on the positioning ring 2 and a pin 23 on the driving ring 1 to urge both rings into their inoperative position.

In the present embodiment the positioning ring 2 serves as a means of moving the shutter blades 3 to the open position independently of the exposure mechanism. This is necessary in single-lens reflex cameras which use the main lens for viewfinding and focusing as well as for projecting an image on to the film. In order to control the ring 2 an actuating device is associated therewith, only one end member of which is shown in the drawings. This end member is a bell crank lever 24 which is mounted on a rotatable shaft 25 and is engaged by a spring 26 that urges the lever in the counterclockwise direction. In this position one arm 24a, which is provided with a finger 24b at its end, hooks into an indentation 2a of the ring 2 to retain the ring in its starting position, which corresponds to the closed position of the shutter blades 3. The other arm 24c is positioned to engage a pin 27 on the ring 2 so that when the lever 24 is rotated clockwise the ring 2 will be unlatched and will be pushed into the setting position shown in FIG. 3 against the pressure of the spring 21. Ring 2 can be retained in this setting position, with the shutter blades 3 in an open position, until the lever 24 is released.

A fixed stop 28 is associated with the ring 2 and is made of a resilient, spring-hard material. This stop may be fixed to the base plate of the shutter by means of screws 29. The ring 2 has a resilient spring-hard projection, or pin, 30 which in the starting position of the ring 2 presses against the edge 28a without play. In order to insure that the projection 30 and the stop 28 will be firmly held together, either the edge 2a or the surface of the finger 24b or both may be provided with a small slope so that when the finger is hooked into place upon the edge 2a, the pressure of the spring 26 forces the finger as far in as may be necessary to cause the stop 28 and the projection 30 to be firmly engaged.

As a result of this firm engagement between the stop 28 and the projection 30, there is a resilient support of the ring 2 in its starting position. This creates a rigid base for a second stop so that a corresponding projection extending from the driving ring 1 and engaging the second stop will rebound therefrom, thus accelerating the driving ring 1 in the reverse direction substantially instantaneously in order to shorten the length of time for moving the shutter blades back to their original closed positions. For this purpose the ring 1 is provided with a projection 31 which strikes a counterstop on the positioning ring 2. While it may be desirable in some instances for the latter stop to be a separate member, a particularly simple structural embodiment can be achieved by using the appropriate surface of the counterstop 30 as the stop for the projection 31. For this purpose, the stop 28, which may be referred to as a rebounding stop, as well as the counterstop 30 must be placed so that the projection 31 impinges on the counterstop 30 at the moment of reversal of motion of the driving ring 1.

The same effect can be obtained by means of an additional stop located on the positioning ring 2 at some distance from the counterstop 30. In this case also, the second stop will have to be positioned so that the projection 31 of the driving ring 1 impinges upon it at the instant of reversal of motion of the driving ring. This additional stop may be preferred in order to achieve a certain flexibility and freedom of choice with respect to the arrangement of the driving mechanism or of the driving ring cooperating therewith.

What is claimed is:

1. A photographic intra-lens shutter comprising: a shutter blade; a first member connected to said blade to position the same between an open position and a closed position; a driving mechanism; a second member connected to said blade to drive said shutter blade and connected to said driving mechanism to be driven thereby to drive said shutter blade from its closed position to its open position and back to its closed position to make a photographic exposure; a fixed rebounding stop; means on said first member to engage said stop when said first member is in position in which said shutter blade is in its closed position; a counterstop on said first member; means on said second member to engage said counterstop when said second member is in the position corresponding to the open position of said shutter blade, whereby said second member rebounds from said counterstop and returns said shutter blade to its closed position.

2. A photographic intra-lens shutter comprising: a shutter blade; a first member connected to said blade to position the same between an open position and a closed position; a driving mechanism; a second member connected to said blade to drive said shutter blade and connected to said driving mechanism to be driven thereby to drive said shutter blade from its closed position to its open position and back to its closed position to make a photographic exposure; a fixed rebounding stop; means on said first member to engage said stop when said first member is in position in which said shutter blade is in its closed position; a counterstop on said first member; means to hold said first member rigidly in position when said second member is in motion; means on said second member to engage said counterstop when said second member is in the position corresponding substantially to the farthest open position of said shutter blade, whereby said second member rebounds from said counterstop and returns said shutter blade to its closed position.

3. A photographic intra-lens shutter comprising: a shutter blade; a positioning member connected to said blade; a driving member connected to said blade; spring means to urge both of said members to their respective rest positions corresponding to a closed position of said shutter blade; means to move said positioning member relative to said driving member to cause said shutter blade to move to an open position; a driving mechanism connected to said driving member to cause said driving member to move relative to said positioning member from the rest position of said driving member to a second position, in which said shutter blade is in its open position, and back to the rest position of said driving member in completing a photographic exposure; a fixed rebounding stop; means on said positioning member to engage said stop when said positioning member is in its rest position; a counterstop on said positioning member; means on said driving member to engage said counterstop when said driving member is in its second position, corresponding to the open position of said shutter blade, whereby said driving member rebounds from said counterstop and returns said shutter blade to its closed position.

4. A photographic intra-lens shutter comprising: a shutter blade; a positioning member connected to said blade; a driving member connected to said blade; spring means to urge both of said members to their respective rest positions corresponding to a closed position of said shutter blade; means to move said positioning member relative to said driving member to cause said shutter blade to move to an open position; a driving mechanism connected to said driving member to cause said driving member to move relative to said positioning member from the rest position of said driving member to a second position, in which said shutter blade is in its open position, and back to the rest position of said driving member in completing a photographic exposure; a fixed rebounding stop; a counterstop on said positioning member to engage said stop when said positioning member is in its rest position; means on said driving member to engage said counterstop when said driving member is in its second position, corresponding to the farthest open position of said shutter blade, whereby said driving member rebounds from said counterstop and returns said shutter blade to its closed position.

5. A photographic intra-lens shutter comprising: a shutter blade; a positioning ring connected to said blade; a driving ring connected to said blade; spring means to urge both of said rings to their respective rest positions corresponding to a closed position of said shutter blade; means to rotate said positioning ring relative to said driving ring to cause said shutter blade to move to an open position; a driving mechanism connected to said driving ring to cause said driving ring to move relative to said positioning ring from the rest position of said driving ring to a second position, in which said shutter blade is in its most open position, and back to the rest position of said driving ring in completing a photographic exposure; a fixed stop; a projection on said positioning ring to engage said stop when said positioning ring is in its rest position; means to hold said projection in rigid contact with said fixed stop when said positioning ring is in its rest position; a counterstop on said positioning ring; a second projection on said driving ring to engage said counterstop when said driving ring is in its second position, corresponding to the most open position of said shutter blade, whereby said second ring rebounds from said counterstop substantially without loss of kinetic energy and returns said shutter blade to its closed position.

6. A photographic intra-lens shutter comprising: a shutter blade; a positioning ring; pin means connecting said ring to said blade; a driving ring; second pin means connecting said driving ring to said blade; spring means to urge both of said rings to their respective rest positions corresponding to a closed position of said shutter blade; a lever engaging said positioning ring to move said positioning ring relative to said driving ring to cause said shutter blade to move to an open position; a driving mechanism connected to said driving ring to cause said driving ring to move relative to said positioning ring from the rest position of said driving ring to a second position, in which said shutter blade is in its most open position, and back to the rest position of said driving ring in completing a photographic exposure; a fixed rebounding stop; a counterstop on said positioning ring to engage said stop when said positioning ring is in its rest position; a hook on said lever to hold said positioning ring rigidly against said fixed stop; a projection on said driving ring to engage said counterstop when said driving ring is in its second position, corresponding to the farthest open position of said shutter blade, whereby said second ring rebounds from said counterstop substantially without loss of kinetic energy and returns said shutter blade to its closed position.

No references cited.

JOHN M. HORAN, *Primary Examiner.*